United States Patent
Greenstein et al.

(10) Patent No.: US 11,190,599 B2
(45) Date of Patent: Nov. 30, 2021

(54) METHOD AND SYSTEM FOR CLOUD SERVICE PRE-PROVISIONING

(71) Applicant: ORACLE INTERNATIONAL CORPORATION, Redwood Shores, CA (US)

(72) Inventors: Paul G. Greenstein, Hopkinton, MA (US); Michael J. Carlson, Missoula, MT (US)

(73) Assignee: Oracle International Corporation, Redwood Shores, CA (US)

( * ) Notice: Subject to any disclaimer, the term of this patent is extended or adjusted under 35 U.S.C. 154(b) by 12 days.

(21) Appl. No.: 16/272,009

(22) Filed: Feb. 11, 2019

(65) Prior Publication Data

US 2020/0007631 A1   Jan. 2, 2020

Related U.S. Application Data

(60) Provisional application No. 62/690,518, filed on Jun. 27, 2018.

(51) Int. Cl.
    *H04L 29/08*  (2006.01)
    *H04L 12/24*  (2006.01)
    *H04L 12/911* (2013.01)

(52) U.S. Cl.
    CPC .......... *H04L 67/16* (2013.01); *H04L 41/0806* (2013.01); *H04L 47/78* (2013.01); *H04L 67/1097* (2013.01)

(58) Field of Classification Search
    None
    See application file for complete search history.

(56) References Cited

U.S. PATENT DOCUMENTS

| | | |
|---|---|---|
| 7,383,405 B2 | 6/2008 | Vega et al. |
| 8,046,767 B2 | 10/2011 | Rolia et al. |
| 8,316,130 B2 | 11/2012 | Breiter et al. |

(Continued)

FOREIGN PATENT DOCUMENTS

| | | |
|---|---|---|
| CN | 102629207 A | 8/2012 |
| CN | 102655503 B | 9/2015 |

OTHER PUBLICATIONS

Rolia et al., A Capacity Management Service for Resource Pools, ACM Digital Library, pp. 1-2, downloaded on Jan. 25, 2018 from: https://dl.acm.org/citation.cfm?id=1071047.

(Continued)

*Primary Examiner* — Aaron N Strange
*Assistant Examiner* — Mohammad Yousuf A. Mian
(74) *Attorney, Agent, or Firm* — Kraguljac Law Group, LLC

(57) ABSTRACT

Systems, methods, and other embodiments associated with pre-provisioning instances of a service are described. In one embodiment, a method includes constructing pre-provisioned instances of a service within a pool. The pool may be evaluated to obtain a list of pre-provisioned instances in response to receiving a request for execution of the service. A pre-provisioned instance is selected from the list of pre-provisioned instances. The pre-provisioned instance then provisioned by retrieving and installing executable code of the service into a computing environment of the pre-provisioned instance. The example method may also include executing the provisioned instance.

17 Claims, 9 Drawing Sheets

(56) References Cited

U.S. PATENT DOCUMENTS

| | | | |
|---|---|---|---|
| 8,463,908 B2 | 6/2013 | Murray et al. | |
| 8,595,722 B2 | 11/2013 | Gupta et al. | |
| 8,639,793 B2 | 1/2014 | Kapur et al. | |
| 9,069,590 B2 | 6/2015 | Gupta | |
| 9,141,487 B2 | 9/2015 | Jagtiani et al. | |
| 9,152,405 B2 | 10/2015 | Gupta et al. | |
| 9,189,259 B2 | 11/2015 | Anderson et al. | |
| 9,250,944 B2 | 2/2016 | Anderson et al. | |
| 9,251,349 B2 | 2/2016 | Haikney et al. | |
| 9,253,114 B2 | 2/2016 | Anderson et al. | |
| 9,285,196 B2 | 2/2016 | Dettori et al. | |
| 9,361,092 B1 | 6/2016 | Bai et al. | |
| 9,396,220 B2 | 7/2016 | Li et al. | |
| 9,405,530 B2 | 8/2016 | Islam et al. | |
| 9,471,350 B2 | 10/2016 | Pavlas et al. | |
| 9,569,259 B2 | 2/2017 | Fries et al. | |
| 9,582,319 B2 | 2/2017 | Ayala et al. | |
| 9,606,826 B2 | 3/2017 | Ghosh et al. | |
| 9,705,820 B2 | 7/2017 | Madduri et al. | |
| 9,712,503 B1 | 7/2017 | Ahmed et al. | |
| 9,736,252 B2 | 8/2017 | Ferris et al. | |
| 9,755,990 B2 | 9/2017 | Vicaire | |
| 9,756,050 B1* | 9/2017 | Brandwine | H04L 63/102 |
| 9,779,126 B2 | 10/2017 | Tu et al. | |
| 10,146,524 B1* | 12/2018 | Killmon | G06F 8/65 |
| 2007/0156903 A1* | 7/2007 | Ardulov | G06Q 10/10 709/226 |
| 2008/0022284 A1 | 1/2008 | Cherkasova et al. | |
| 2010/0281285 A1 | 11/2010 | Blanding | |
| 2011/0213886 A1* | 9/2011 | Kelkar | G06F 9/5072 709/226 |
| 2012/0271996 A1* | 10/2012 | Jenkins | G06F 3/067 711/114 |
| 2013/0159453 A1 | 6/2013 | McLean | |
| 2014/0136711 A1* | 5/2014 | Benari | G06F 9/5061 709/226 |
| 2014/0157434 A1* | 6/2014 | Graves | H04L 63/102 726/28 |
| 2015/0120928 A1* | 4/2015 | Gummaraju | H04L 67/1008 709/226 |
| 2015/0222501 A1* | 8/2015 | Dettori | H04L 41/5051 709/223 |
| 2015/0286507 A1 | 10/2015 | Elmroth et al. | |
| 2015/0317081 A1* | 11/2015 | Singh | G06F 9/48 711/114 |
| 2015/0372938 A1 | 12/2015 | Patel et al. | |
| 2015/0372941 A1 | 12/2015 | Patel et al. | |
| 2016/0323374 A1* | 11/2016 | Russinovich | G06F 9/5072 |
| 2016/0378524 A1 | 12/2016 | Gough et al. | |
| 2017/0026309 A1* | 1/2017 | Vicaire | G06F 9/5061 |
| 2017/0116207 A1 | 4/2017 | Lee et al. | |
| 2017/0116213 A1 | 4/2017 | Jain et al. | |
| 2017/0116249 A1 | 4/2017 | Ravipati et al. | |
| 2017/0116298 A1 | 4/2017 | Ravipati et al. | |
| 2017/0116334 A1 | 4/2017 | Kruglikov et al. | |
| 2017/0187806 A1 | 6/2017 | Wang et al. | |
| 2018/0075041 A1 | 3/2018 | Susairaj et al. | |
| 2018/0075044 A1 | 3/2018 | Kruglikov et al. | |
| 2019/0278620 A1* | 9/2019 | Korbar | H04L 41/12 |
| 2019/0286373 A1* | 9/2019 | Karumbunathan | G06F 3/0661 |

OTHER PUBLICATIONS

De et al., Caching Techniques for Rapid Provisioning of Virtual Servers in Cloud Environment, IEEE Conference Publication, pp. 1-3, downloaded Jan. 24, 2018 from: http://ieeexplore.ieee.org/document/6211956/.

De et al., Caching VM Instances for Fast VM Provisioning: A Comparative Evaluation; IBM Research India, pp. 1-11, downloaded on Mar. 9, 2018 from: https://www3.cs.stonybrook.edu/~prade/MyPubs/2012-europar.pdf.

Bankole et al., Predicting Cloud Resource Provisioning Using Machine Learning Techniques; IEEE Xplore Digital Library, pp. 1-2, downloaded on Mar. 9, 2018 from: http://ieeexplore.ieee.org/document/6567848.

Amazon Web Services, Migrating AWS Resources to a New AWS Region, pp. 1-43, downloaded on Mar. 8, 2018 from: https://d0.awsstatic.com/whitepapers/aws-migrate-resources-to-new-region.pdf.

Geier, Moving EC2 Instances Across Availability Zones or AWS Regions, pp. 1-4, downloaded on Jan. 24, 2018 from https://www.serverwatch.com/server-tutorials/moving-ec2-instances-across-availability-zones-or-aws-regions.html.

Google, Moving an Instance Between Zones, pp. 1-5, downloaded Jan. 19, 2018 from: https://cloud.google.com/compute/docs/instances/moving-instance-across-zones.

Google, Live Migration, pp. 1-4, downloaded Jan. 19, 2018 from: https://cloud.google.com/compute/docs/instances/live-migration.

VMware, Inc., VMware VMotion, Live Migration of Virtual Machines Without Service Interruption, pp. 1-2, downloaded on Jan. 19, 2018 from: https://www.vmware.com/pdf/vmotion_datasheet.pdf.

KVM, Migration, pp. 1-4, downloaded Jan. 19, 2018 from: https://www.linux-kvm.org/page/Migration.

Alibaba Cloud, ApsaraDB for RDS, User Guide, pp. 1-79, downloaded Jan. 19, 2018 from: https://www.alibabacloud.com/help/doc-detail/26181.htm.

Scott Scovell, Migrating Azure Virtual Machines to Another Region / Kloud Blog, pp. 1-3, downloaded Jan. 19, 2018 from: https://blog.kloud.com.au/2014/11/16/migrating-azure-virtual-machines-to-another-region/.

Flanegin, Oracle Access Manager—Upgrade Guide, Oct. 2007, pp. 1-654, downloaded on Mar. 9, 2018 from: https://docs.oracle.com/cd/E12530_01/oam.1014/b32416/zdt_ovr.htm.

\* cited by examiner

METHOD AND SYSTEM FOR CLOUD SERVICE PRE-PROVISIONING

CROSS REFERENCE TO RELATED APPLICATIONS

This disclosure claims the benefit of U.S. Provisional Patent Application Ser. No. "62/690,518" filed Jun. 27, 2018, titled "Method and System for Cloud Service Pre-Provisioning", which is incorporated by reference herein in its entirety.

BACKGROUND

Cloud computing is an information technology (IT) paradigm that enables ubiquitous access to shared pools of configurable system resources and higher-level services that can be rapidly provisioned with minimal management effort, often over the Internet. Third-party clouds enable organizations to focus on their core businesses instead of expending resources on computer infrastructure and maintenance. Cloud providers typically use a "pay-as-you-go" model, a subscription model, or a variety of other models. A cloud computing environment (aka "cloud environment") is a collection of physical and virtual infrastructure hardware and software used for cloud computing. The cloud computing environment can be used to provide services (known as "cloud services").

The combination of Virtual Machines (VMs), network connectivity among them, their operating systems, and middleware and application software stacks on each VM comprise a service instance. In Oracle cloud services, for example, each service includes a routing tier, a middle tier, and possibly a data tier. Usually, the routing and data tiers are shared among multiple middle tier service instances (hereinafter, instances). Instances are standardized and comprised of a collection (particular to each service) of VM shapes (specifications of CPU, memory, storage).

Cloud services are provisioned on-demand. When a customer orders a service, an order processing system receives the type of service being ordered and submits the request to a service provisioning system, which initiates service provisioning. Service provisioning involves creation, configuration, and startup of the instance. This is a lengthy process that typically takes minutes, but sometimes, under high-demand, can take hours.

The cloud computing environment hosts various services (cloud services) that can be accessed remotely (by remote devices, programs, or people) over a network. As used herein, a remote device accessing the cloud computing environment may correspond to a program, executing code, a user, etc. utilizing a remote device (hardware or software) to access the cloud computing environment over a network. Some cloud services are shared—where all users access the same instance of a service. Other cloud services require existence of a service instance per user or group of users. The latter, in order to be used by a particular party, need to be provisioned. In prior systems, all cloud services require existence of a service instance per user or group of users. In some cases this group of users includes all users. Regardless of the mapping of instances to users, provisioning is always required. Even if all users share the only existing instance, someone had to provision that instance and, likely, provide user access to it. A user will subscribe to the cloud computing environment by providing identifying information and an intent to utilize one or more services in the future. Once the subscriber is defined, the subscriber can request access to a service instance. When a request for access to the service is received from a remote device, an instance of the service is created on-demand and executed. On-demand creation and execution of the instance is triggered when the cloud computing environment receives the request for access to the service. A service instance (hereinafter "instance") is a collection of one or more computing resource(s) interrelated in a way defined by the particular service and comprising an orderable and provisionable unit of the service. The instance can be hosted within a virtual machine that executes software of the service using processor, memory, and storage resources of the cloud computing environment. The instance can be comprised of a collection of virtual machines of diverse shapes.

On-demand creation of an instance of a service is time consuming and consumes a large amount of computing resources. The time to create the instance can take minutes or even hours when the cloud computing environment is under high demand or associated provisioning systems may be under high demand. This introduces significantly delays in availability of the service to the requestor because the requestor cannot access the service until the instance is fully created and executing. Further, there may not be adequate computing resources available or reserved for the creation of the instance when the request is received, and thus the creation of the instance is further delayed. This can also result from cloud service providers deliberately over-subscribing their resources based upon an assumption that all users would be unlikely to attempt to access their services concurrently.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
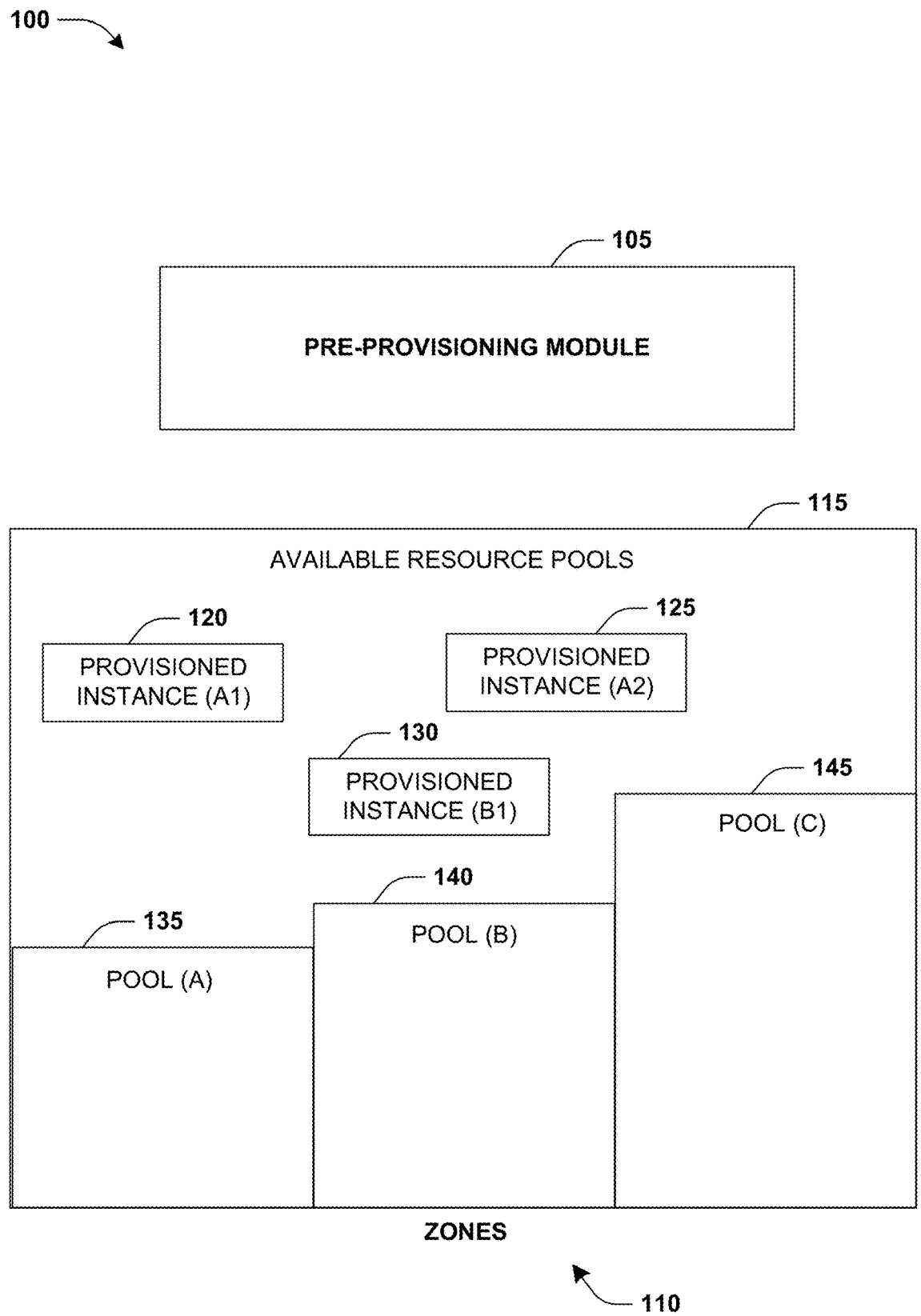
FIG. 1 illustrates an embodiment of a system associated with pre-provisioning instances of a service.

Computerized systems and methods are described herein that provide for pre-provisioning instances of a service. A cloud computing environment or other computing system is capable of executing instances of services requested by remote computing devices. A service corresponds to a software application or suite of applications having executable code that is executed using computing resources of the cloud computing environment. The cloud computing environment may host a variety of services. For example, the service may comprise a calendar service, an email service, a financial analysis service, or any other type of application that can be executed by the cloud computing environment.

Prior techniques assume on-demand creation. Even when discussing pooling of VMs, the prior techniques assume that it happens shortly before these VMs are needed. In one embodiment, the present approach is to pre-create as many instances as early as possible, thus eliminating a risk of resource unavailability at the time of pre-creation, or pre-creation taking longer than expected. In effect, the present system moves provisioning into the domain of capacity management, i.e. related to acquisition of infrastructure, rather than service fulfillment activity, i.e. on-demand creation.

As used herein, a "pre-provisioned instance" includes a configured collection of Virtual Machines (VMs) and service-supporting dependencies including computer resources. This is an initial resource configuration but has no specific application software loaded. The pre-provisioned instance is proactively constructed in advance of an anticipated demand for a service so the system can more quickly setup and provide the service when needed. The pre-provisioned instance does not include application software (executable code) of a service and is not yet assigned to a customer in production.

A "provisioned instance" is a pre-provisioned instance that includes the application software for a requested service (application is installed in the instance). Being "provisioned" means that the provisioned instance is also uniquely assigned to a customer and is executing in a production setting (and the provisioned instance is also referred to as a production instance).

A "pointer" as used in one or more embodiments is a means of identifying and/or locating an instance. Pointers and/or tags are used to assign or add (hereinafter referred to as 'assignment') an instance to a selected pool of instances. Pointers are stored and maintained in a data structure stored in a memory. A service instance is typically identified and referred to by a pointer or tag in one of several ways. For example, (1) by an IP address of one of the elements of the instance (such as a front-end load balancer, but possibly one VM of the instance); (2) by a URL or URI of the instance (for example, pointing at the front-end load balancer, but may be directly at VM's Web destination or Web service end point, such as REST or SOAP); (3) by symbolic name translatable via DNS (domain name server) into an IP address (thus reduced to 1); (4) by symbolic name (or tag) translatable by an inventory system into the one of the examples 1-3 above; or (5) by variations of the previous examples. In another embodiment, even though an instance does not have to contain a pointer, the pointer contains the identification of that instance. Thus, if the instance is known, its pointer can be found in one of the pools by searching for the identification within the pointers. If the pointer is not found in a pool, then the instance has not been assigned to that pool.

In another embodiment where instances have multiple virtual machines (multi-VM instances), if it is desired to know all the elements comprising an instance, an inventory system would be consulted, or a self-description method could exist, similar to the above pointers, which would return an enumeration of all entities comprising an instance.

A "pool" of instances, in one embodiment, is defined by a collection of instance pointers that identifies the instances that belong to the pool. For example, a data structure is created to maintain the collection of instance pointers for each pool. When an instance is assigned to a pool, its pointer is added to the corresponding collection of pointers for that pool (e.g., a pool pointer list). When an instance is removed from a pool, its pointer is removed from the corresponding collection of pointers. Moving an instance from pool 1 to pool 2 is a combination of removing the pointer from pool 1 and adding the pointer to the collection of pointers for pool 2.

In one embodiment, instances are assigned to pools and located by pointers and/or tags that identify an assignment relationship between an instance and a pool. A pool of instances is defined by a collection of pointers that belong to that pool. Assigning an instance to a pool involves adding a pointer of the instance to the collection of pointers of the pool. Moving an instance from one pool to another pool involves removing the pointer from a current pool and reassigning (by adding) the pointer of the instance to a different pointer collection associated with the other pool. In one embodiment, a list or collection of pointers is maintained for each pool that identifies the instances that belong to that pool.

An instance of a service is provisioned by configuring one or more VM shapes (e.g., specifications of CPU, CPU cycles, a number of processors, memory resources, storage resources, and networking resources) to a computing environment based on the type of service requested. The computing environment, such as a virtual machine, is configured to execute the executable code of the service through the provisioned instance. That is, a provisioning system determines an appropriate VM shape and uses resources to create one or more virtual machines to execute a service instance being provisioned. In one embodiment, resources include instances of other services. For example, a service requires a network load balancer and a database. The service will make use of a Load Balancer as a Service (LBaaS) and a Database as a Service (DBaaS) as ready, separately provisionable, service instances. The provisioning system may be called (e.g., recursively) to provision lower level services for use by the new service instance being provisioned. In this way, a remote device can access functionality of the service through the executing provisioned instance hosted by the cloud computing environment.

On-demand creation and execution of instances of a service consumes considerable amounts of computing resources and time, which can result in significant delays in access to the service. On-demand creation and execution of instances is unable to address high-volume instance creation and execution because there could be a lack of adequate resources for creating a volume of instances on-demand.

Accordingly, as provided herein, the present system implements a pre-provisioning module that is capable of pre-provisioning any number of instances of a service. In particular, the pre-provisioning module constructs pre-provisioned instances of the service within a pool designated for the service. A pre-provisioned instance comprises a computing environment of computing resources, based on a specifications of processor, memory, storage, and network resources based the type of instance. In order to install and execute code of a service, a pre-provisioned instance turns the resources into one or more virtual machines. In one embodiment, the pre-provisioned instance does not comprise the executable code of the service, such as a software application or stack of the service. In another embodiment, a pre-provisioned instance may include the service application. Any number of pre-provisioned instances (constrained to an amount of physical resources available) can be constructed within the pool at any time, as opposed to on-demand in response to a request for the service.

When a subsequent request is received from a remote device for access to the service, a pre-provisioned instance is provisioned as a provisioned instance of the service. In particular, the executable code of the service is retrieved and installed into the computing environment of the pre-provisioned instance to create the provisioned instance. The executable code of the provisioned instance is executed using the pre-provisioned computing resources of the computing environment in order to provide the remote device with access to functionality of the service.

Constructing and maintaining the pre-provisioned instances within the pool for subsequent provisioning improves upon existing technological processes for hosting instances of a service. In particular, high-volume provisioning of a service for a large number of requests from remote computing devices can be achieved in a relatively short amount of time. This is achievable because installation of the executable code takes a lot less time than creating the computing environment for the pre-provisioned instance. Thus, since the pre-provisioned instances are already created with the computing environment, the provisioning can be quickly performed and/or performed in parallel because merely the executable code needs to be installed. In this way, proactively constructing the pre-provisioned instances reduces the time of service provisioning so that clients do not experience high latency with gaining access to the service.

Furthermore, proactively constructing the pre-provisioned instances mitigates the risk of resource unavailability for provisioning instances of the service. That is, the pre-provisioned instances are proactively constructed with computing resources before there is demand for the service. Thus, if there is an inadequate amount of available resources needed to provision the service when the service is requested, such low availability does not affect provisioning instances of the service because computing resources have already been configured and setup as the pre-provisioned instances. In this way, proactively constructing the pre-provisioned instances helps eliminate provisioning failures due to unavailability of computing resources.

With reference to FIG. 1, one embodiment of a system 100 associated with pre-provisioning instances of services is illustrated and summarized. A more detailed description is provided with reference to FIG. 2. The system 100 is implemented as a pre-provisioning module 105 hosted on a computing device. In one embodiment, the pre-provisioning module 105 is associated with a cloud computing environment that hosts services made accessible to remote devices (e.g., an application, a user, a computer executing code, etc.). Such services can correspond to application hosting services, Software as a Service (SaaS), network storage, and a wide variety of other software applications and computer services. Such instances of services are executed using computing resources of the cloud computing environment.

Zones 110 of computing resources of the cloud computing environment can be defined. A zone is an elastic operational environment that is able to adapt to service workload changes by provisioning and de-provisioning computing resources in an autonomous manner. In one embodiment as used herein, elastic computing is a concept in cloud computing in which computing resources can be scaled up and down easily by the cloud service provider. Elastic computing is the ability of a cloud service provider to provision flexible computing power when and wherever required. The elasticity of these resources can be in terms of processing power, storage, bandwidth, etc.

The zones 110 have available resource pools 115 of processor, memory, storage, network resources, and/or other computing resources. In one embodiment, instances of a service can be confined to executing within a single zone using available sources of the zone. For example, a first provisioned instance 120 and a second provisioned instance 125 of a service (A) are executing within a zone using available resources of that zone. A provisioned instance 130 of a service (B) is executed within a second zone using available resources of that second zone. In another embodiment, instances of the service can execute within multiple zones. For example, other provisioned instances of the service (A) may be executing within the second zone and/or other zones.

The pre-provisioning module 105 improves existing technological processes for provisioning instances of services by constructing pre-provisioned instances of a service within a pool for the service. That is, existing technological processes provision instances on-demand in response to a request for the service. However, provisioning a requested number of instances can take a significant amount of time and could require more computing resources than what is available. Accordingly, the pre-provisioning module 105 proactively constructs the pre-provisioned instances within computing environments. In this way, the pre-provisioned instances are available with pre-constructed computing environments for subsequent provisioning.

A pre-provisioned instance is constructed using available resources from an available resource pool of a zone. In one embodiment, the pre-provisioned instance is assigned processing, memory, storage, and network resources to create a computing environment capable of executing executable code of the service. The computing environment may comprise a virtual machine or any other environment capable of executing the executable code such as a software stack of the service. Constructing the computing environment consumes a lot of resources and time. Thus, the more resource and time consuming part of provisioning instances is performed ahead of time before any requests for the service are received. In one embodiment of constructing pre-provisioned instances of services, a pool (A) 135 for the service (A) is populated with pre-provisioned instances comprising computing environments capable of executing code of the service (A). A pool (B) 140 for the service (B) is populated with pre-provisioned instances comprising computing environments capable of executing code of the service (B). A pool (C) 145 for a service (C) is populated with pre-provisioned instances comprising computing environments capable of executing code of the service (C).

A request for execution of the service is received, such as from a remote device over a network. Accordingly, pre-provisioned instances are selected from the pool based upon the pre-provisioned instances having computing resources matching computing resources requested for executing the service. The executable code, such as a current version of the service, is retrieved and installed within the computing environments of the pre-provisioned instances. This process consumes a lot less time and resources than the construction of the pre-provisioned instances. Thus, the time to provision instances of the service from when the request is received is greatly reduced, improving operational efficiency of the computers within the cloud computing environment because adequate computing resources have already been configured and setup. Also, operation of the remote computing device relying upon execution of the service is improved because the remote computing device will have access to executing instances of the service much quicker. Thus, the remote computing device can operate with less latency.

Figure 2:
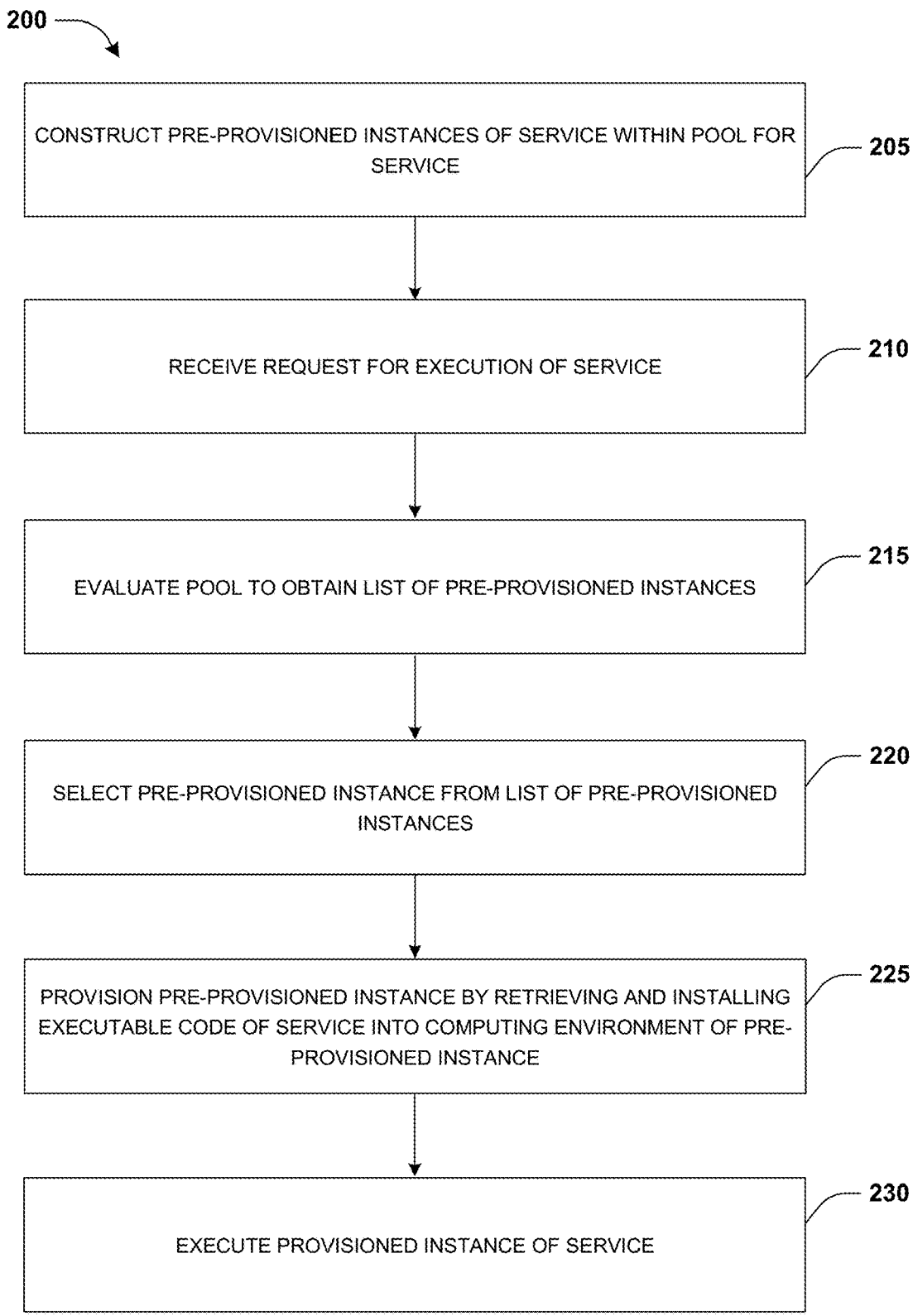
FIG. 2 illustrates an embodiment of a method associated with pre-provisioning instances of a service.
Figure 3:
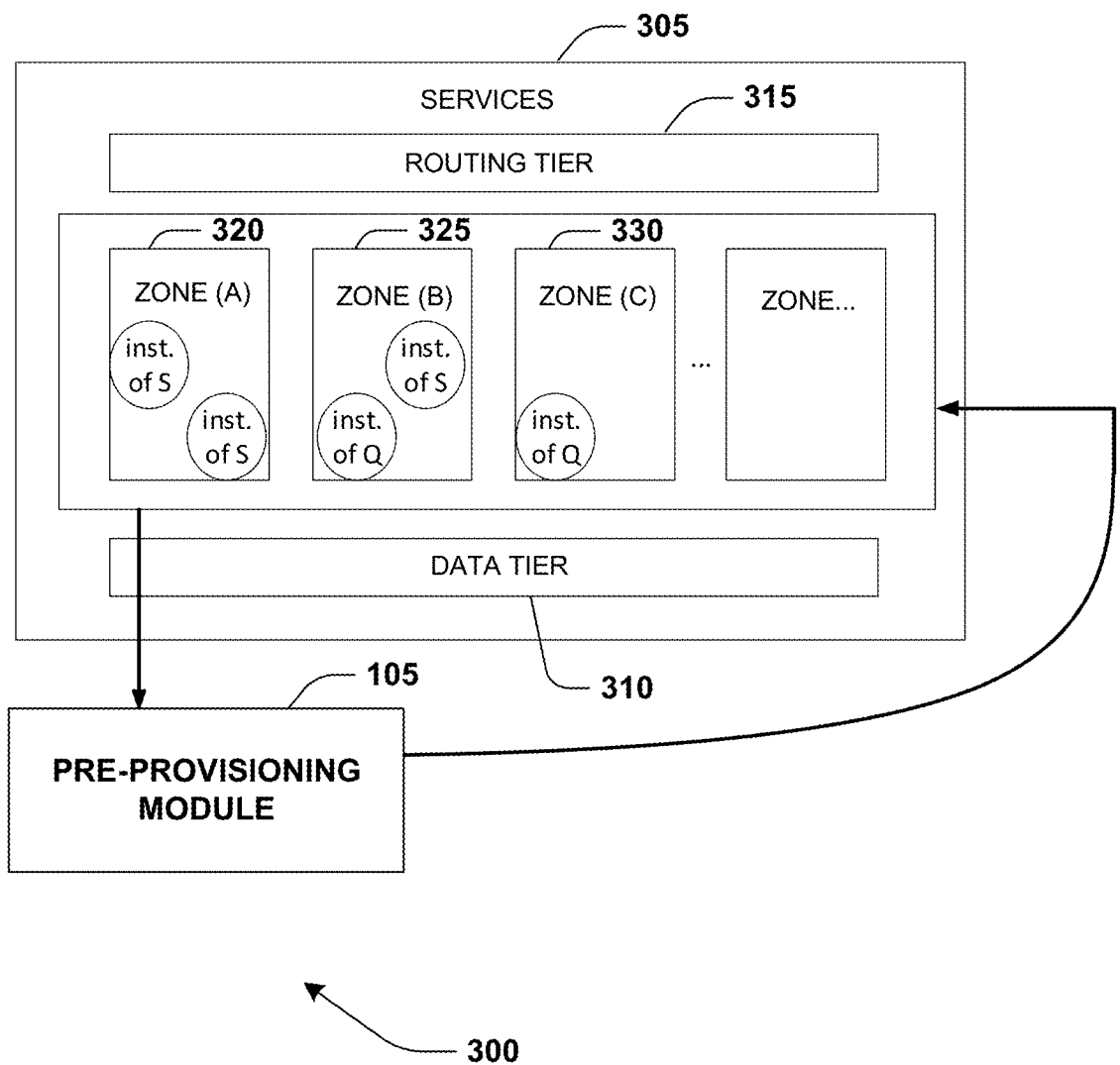
FIG. 3 illustrates an embodiment of a system associated with pre-provisioning instances of a service.

With reference to FIG. 2, one embodiment of a computer implemented method 200 associated with pre-provisioning services is illustrated. In one embodiment, the method 200 is performed by the pre-provisioning module 105 and systems 300 and 400 of FIGS. 3, 4A, and 4B utilizing various computing resources of the computer 615 of FIG. 6 or other computers. The computing resources, such as the processor 620, are used for executing instructions associated with constructing pre-provisioned instances of a service and provisioning the pre-provisioned instances as provisioned services. Memory 635 and/or disks 655 are used for storing pre-provisioned instances and/or other data. Network hardware is used for providing remote devices with access to executing provisioned instances over a network. The method 200 is triggered upon a command to host a service such as through a cloud computing environment or cloud service hosting environment.

The cloud computing environment comprises computing resources, such as servers, networking equipment, and storage, used to host services 305. The services 305 are made accessible by the cloud computing environment to remote devices over a network. Such services 305 can correspond to a wide variety of services, such as storage services, application hosting services, analytics, etc. In one embodiment of a single-tenant service, each remote device requesting access to the service, an instance of the service is provisioned and executed for each remote device. In one embodiment of a multi-tenant service, when a user orders a service, a tenant is added to an existing instance. In one embodiment from a computer's perspective, the tenant is, essentially, a user account (which may include a registration record and access). In this case, provisioning of instances happens infrequently, but typically requires significantly more resources than single-tenant instances. An instance is executed using computing resources of the cloud computing environment provisioned for the instance. In one embodiment, an instance is comprised of a virtual machine that has access to the provisioned computing resources, such as processor, memory, storage, and networking resources. In one embodiment of a multi-tenant service, the instance is hosted within a collection of virtual machines (e.g., virtual machines for a routing tier, a middle tier, and a data tier), and a user account is added to the collection of virtual machines.

The cloud computing environment comprises a routing tier 315. The routing tier 315 comprises network routing hardware and functionality. The routing tier 315 is configured to direct requests from remote devices for a service to appropriate instances of the service. Similarly, the routing tier 315 transmits back information and data from a service to a remote device. In this way, data is transferred between remote devices and instances hosted by the cloud computing environment by the routing tier 315. The routing tier 315 can be used to transmit data between instances, such as where an instance of one service processes data from an instance of another service.

The cloud computing environment comprises a data tier 310. The data tier 310 comprises a plurality of storage devices, databases, and data access functionality. Client data of clients that utilize the services 305 of the cloud computing environment is stored within the data tier 310. In this way, when a remote device of a client invokes an instance of a service to execute, the instance will process client data that is stored within the data tier 310 for that client.

Zones may be defined within the cloud computing environment, such as a zone (A) 320, a zone (B) 325, a zone (C) 330, etc. A zone is an operational environment of computing resources that can be used to host instances of services. The zone may be defined as a logical or physical entity for hosting instances of services utilizing virtual machines and the computing resources of the zone. Instances of a service may be hosted within a single zone or may be hosted within multiple zones. For example, instances of a service (S) may be hosted within the zone (A) 320 and the zone (B) 325 using processor, memory, storage, and network resources of respective zones. Instances of a service (Q) may be hosted within the zone (B) 325 and the zone (C) 330 using processor, memory, storage, and network resources of respective zones. In this way, services are assigned to particular zones so that instances of those services can be executed using computing resources of those zones.

Figure 4A:
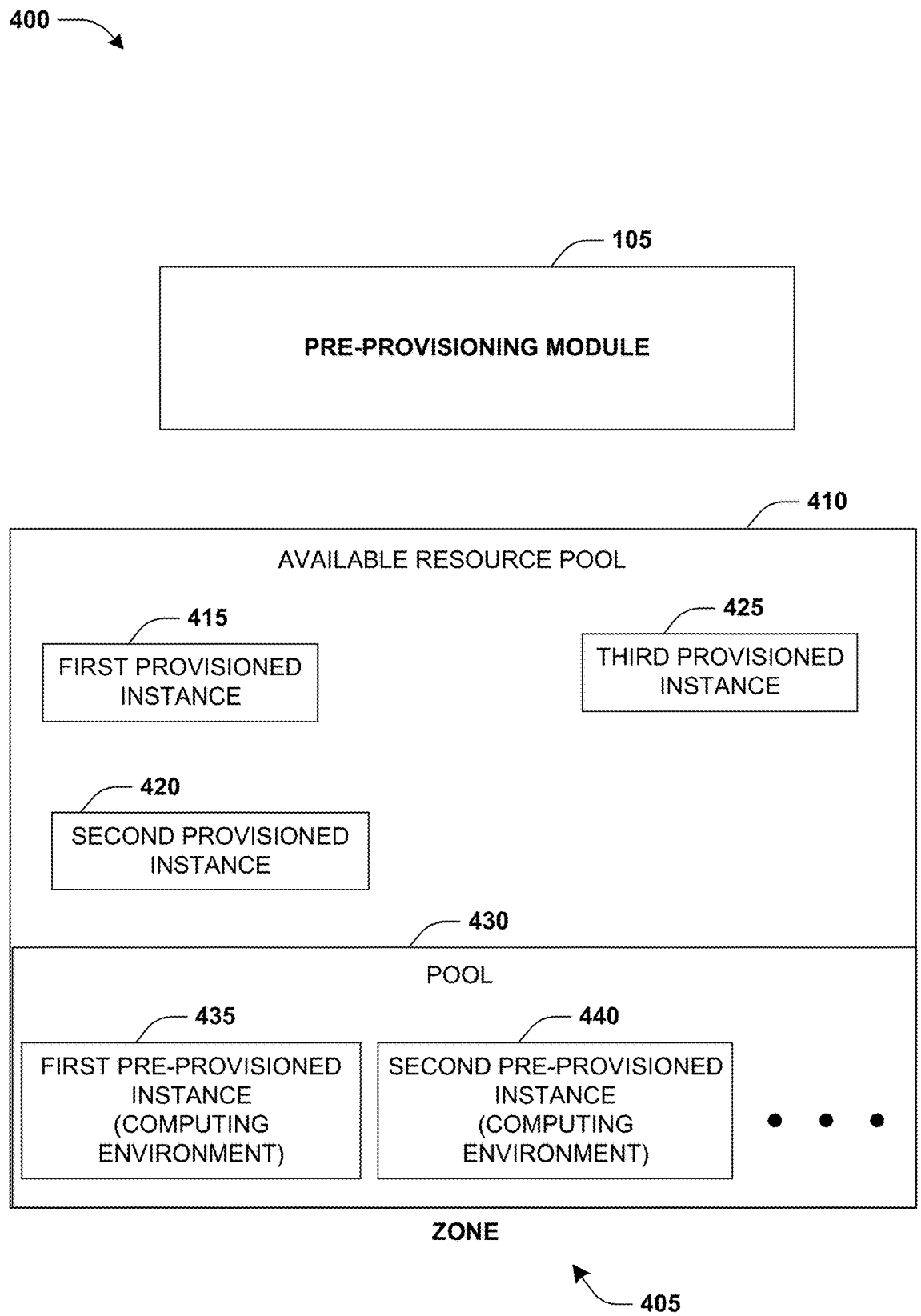
FIG. 4A illustrates an embodiment of a system associated with pre-provisioning instances of a service, where a pool of pre-provisioned instances is maintained.

Available resource pools are assigned to each zone of the cloud computing environment. An available resource pool of a zone comprises processor, memory, storage, and network resources (e.g., IP addresses) that can be used by executing instances of services. For example, a virtual machine, executing an instance of an analytics application, can utilize the available resources for executing the analytics application. In one embodiment, an available resource pool 410 of computing resources is assigned to a zone 405, as illustrated in FIG. 4A. In this way, provisioned instances of services can be executed through virtual machines utilizing available resources from the available resource pool 410 of zone 405.

Figure 4B:
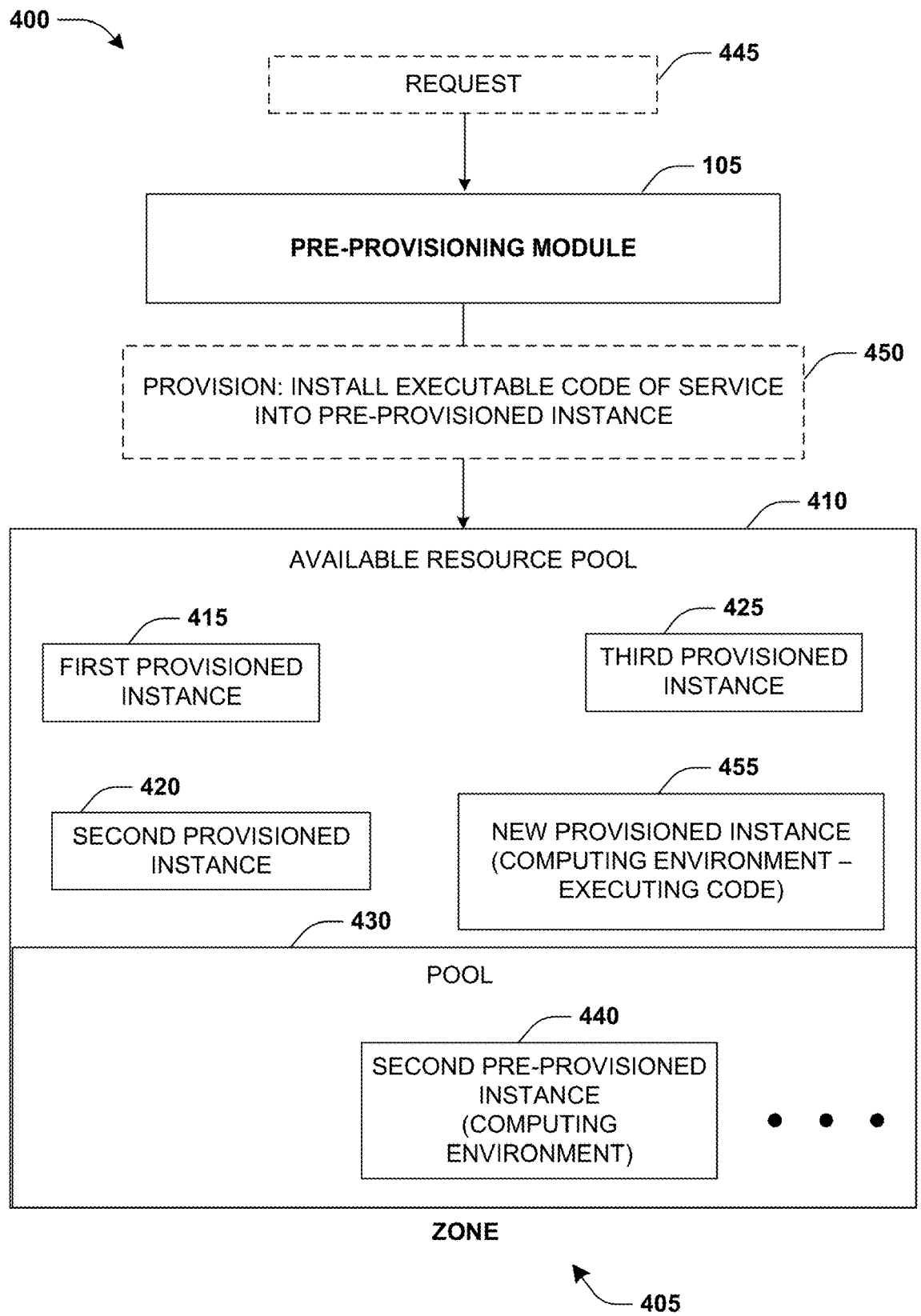
FIG. 4B illustrates an embodiment of a system associated with pre-provisioning instances of a service, where a pre-provisioned instance is provisioned as an executing instance.

The computing resources of the available resource pool 410 can be used by the pre-provisioning module 105 to construct pre-provisioned instances of a service within a pool 430 of pre-provisioned instances, which is further described in conjunction with FIGS. 4A and 4B. The pool 430 is a logical or physical construct designated for the storage of pre-provisioned instances of a particular service. The pool 430 is defined by a collection of instance pointers that identify which pre-provisioned instances belong to (are assigned to) the pool 430. The pre-provisioning module 105 assigns the pool 430 to the zone 405 so that pre-provisioned instances of a service can be constructed within the pool 430 using computing resources from the available resource pool 410. When a pre-provisioned instance is assigned to a pool, an instance pointer for the pre-provisioned instance is added to the appropriate collection of instance pointers for the pool.

In one embodiment, a request to create the pool 430 is received. The request designates a service for which the pool 430 is to be created. The request may specify an initial size of the pool 430, such as an amount of computing resources that are allowed to be used for constructing pre-provisioned instances of the service within the pool 430. The size may be dynamically adjusted based upon resource utilization of the zone 405. For example, if more computing resources are needed for executing provisioned instances, then the size of the pool 430 may be decreased. In another example, a projection/prediction of future demand of new instances is determined and used to determine how many pre-provisioned instances should be proactively created. The prediction may take into account historic demand, trends of demand, etc.

In one embodiment of decreasing the size of the pool 430, one or more pre-provisioned instances within the pool 430 may be removed and decommissioned. This releases the pre-provisioned instances' assigned computing resources back into the available resource pool 410 for use by the provisioned instances. The number of decommissioned pre-provisioned instances may be based upon the new size of the pool 430. Removing instances from the pool 430 involves removing the corresponding instance pointer from the pointer list of the pool. Thus the size of the pool 430 is reduced. In this way, pools may be created, deleted, and/or pre-provisioned instances within pools may be created or decommissioned based upon fluctuations in resource utilization of the zone 405 and service demand.

At 205, pre-provisioned instances of a service are constructed within the pool 430. For example, a first pre-provisioned instance 435, a second pre-provisioned instance 440, and/or other pre-provisioned instances of the service are created within the pool 430. The corresponding instance pointers are added to the pointer list of the pool 430 to designate that the instances are assigned to the pool 430. In one embodiment of pre-provisioning, available memory, processor, storage, and network resources (e.g., IP addresses) are obtained from the available resource pool 410. The available resources are used to construct a computing environment such as a virtual machine capable of executing executable code of the service. For example, the executable code is a software application or software stack of the service, such as a calendar application of cloud calendar service. An amount of memory, processor, storage, and other resources for executing the calendar application are used to construct the computing environment. The amount of resources may also be determined based upon other requirements of executing an instance of the cloud calendar service, such as resources for executing a virtual machine hosting the instance such as an OS of the virtual machine and other software executed by the virtual machine.

The pre-provisioned instances are proactively created in anticipation of a future need for a full provisioning of executing instances of the service. That is, the pre-provisioned instance is not created on-demand and is not triggered in response to a request for execution of the service. Thus, any number of pre-provisioned instances can be constructed based upon predictive analysis of future demand for the service. Since the pre-provisioned instance may not be created for immediate use, the executable code of the service is not installed within the computing environment of the pre-provisioned instance. That is, the pre-provisioned instance is constructed with a computing environment of computing resources configured for subsequent installation and execution of the executable code of the service. The installation occurs later during provisioning of the service in response to receiving a request for execution of the service.

One benefit of deferring install of the executable code is that updates and maintenance to the executable code of the service do not need to be propagated and performed upon the pre-provisioned instances. Instead, the latest version of the executable code is identified, retrieved, and installed into the pre-provisioned instances during provisioning. This saves significant computing resources and time otherwise wasted in upgrading and maintaining pre-provisioned instances every time the service is upgraded or modified. In one embodiment, a determination is made that there is an available update for the executable code. The available update is retrieved and applied to the executable code of the service to modify the executable code, such as within a code base of the service. In this way, the code base of the service now comprises the modified executable code of the service. However, the available update is not applied to the pre-provisioned instances because the executable code was not installed into the pre-provisioned instances. When the pre-provisioned instances of the service are subsequently provisioned, the modified executable code is installed into the pre-provisioned instances from the code base. Already provisioned instances of the service are upgraded using the available update.

In one embodiment, one or more instances of the service have already been provisioned, such as a first provisioned instance 415, a second provisioned instance 420, and a third provisioned instance 425. The executable code was installed into the provisioned instances, such as during full provisioning. The executable code is executed using available resources of the available resource pool 410, such as processor, memory, storage, and network resources. The executable code of reach provisioned instance may be executed by virtual machines. Each provisioned instance may have been provisioned and executed in response to requests from remote devices for access to the service.

At 210, a request 445 for execution of the service is received by the pre-provisioning module 105, as illustrated in FIG. 4B. In one embodiment, a remote device may transmit the request 445 over a network to the cloud computing environment for the cloud calendar service. For example, a user of the remote device may be attempting to access their cloud calendar. The request 445 may be routed to the pre-provisioning module 105 in order to provision an instance of the service for the user associated with the remote device.

At 215, the pool 430 is evaluated to obtain a list of pre-provisioned instances available from the pool 430. In one embodiment, the pre-provisioning module 105 maintains a data structure, which includes a collection of pointers (e.g. a pointer list or table) comprising instance pointers that identify and locate the pre-provisioned instances that the pre-provisioning module 105 created within the pool 430. The pre-provisioned instances assigned to the pool 430 are identified by the instance pointers in the pointer list. If a pre-provisioned instance is provisioned or decommissioned and thus removed from the pool 430, then the pre-provisioning module 105 updates the pointer list data structure to remove the corresponding instance pointer of the pre-provisioned instance. The data structure may be populated with other information such as which service a pre-provisioned instance is associated, what computing resources are assigned to a pre-provisioned instance, etc. In this way, the data structure is evaluated to identify the list of pre-provisioned instances.

At 220, a pre-provisioned instance is selected from the list of pre-provisioned instances. In one embodiment where all pre-provisioned instances have the same computing resources, any pre-provisioned instance is selected. In another embodiment, pre-provisioned instances may be assigned different types or amounts of computing resources or software. Accordingly, the pre-provisioned instance is selected based upon the pre-provisioned instance having computing resources and software matching computing resources and software requested for executing the service. For example, some users may subscribe to certain levels of services, such as more data redundancy, lower latency, deduplication for improved storage, additional software features, etc. Thus, pre-provisioned instances may be pre-provisioned with various levels of computing resources and software. Such information may be stored within the data structure maintained by the pre-provisioning module 105 for the pool 430. Accordingly, the pointer list data structure can be evaluated to identify the pre-provisioned instance such as the first pre-provisioned instance 430 as having computing resources and software matching what was requested by the request 445.

At 225, the selected first pre-provisioned instance 435 is provisioned 450 by the pre-provisioning module 105 to create a new provisioned instance 455. In particular, the pre-provisioning module 105 identifies the latest executable code of the service. For example, the pre-provisioning module 105 consults the code base of the service to identify and retrieve the most up-to-date version of the executable code. The pre-provisioning module 105 installs the executable code into the computing environment of the first pre-provisioned instance 435 to create the new provisioned instance 455. For example, the executable code of the calendar application is installed into a virtual machine of the first pre-provisioned instance 435. Thus, an operating system of the virtual machine can execute the calendar application using the computing resources previously assigned from the available resource pool 410 to the first pre-provisioned instance 435. In this way, the new provisioned instance 455 of the service is assigned to a requesting user and executed for remote access over the network by the remote device, such as to provide the user with access to the user's calendar through the calendar application, at 230. The first pre-provisioned instance 435 is removed from the pool 430 by removing its corresponding instance pointer from the collection of pointers (pointer list) belonging to the pool 430.

Because the pre-provisioned instances already exist and are ready for installation of the executable code, the amount of time and computer resources used for provisioning is greatly reduced. This means that the remote device has much quicker access to the service than if pre-provisioning was not performed, thus reducing client latency. This is because pre-provisioning is much more time consuming and resource intensive, and is done proactively so that an adequate number of pre-provisioned instances are ready for provisioning. This is also helpful for situations where a lot of instances need to be provisioned at once, such as where 1,000 calendar application instances need to be provisioned for creating 1,000 new user accounts. Having pre-provisioned instances already available with computing environments of computing resources helps eliminate situations where adequate resources are not available at time of provisioning.

In another embodiment, pre-provisioned instances may be constructed as a partial instance. i.e., the majority of an instance is built during pre-pre-provisioning, but some resources that normally comprise an instance are added subsequently as a part of provisioning. For example, if a service instance includes five virtual machines (VMs) and two load balancers, a partial pre-provisioned instance may be constructed to include five VMs, and the load balancers may be added later during provisioning. This retains the benefit of pre-provisioning if the addition of load balancers is fast relative to creation of VMs.

Figure 5:
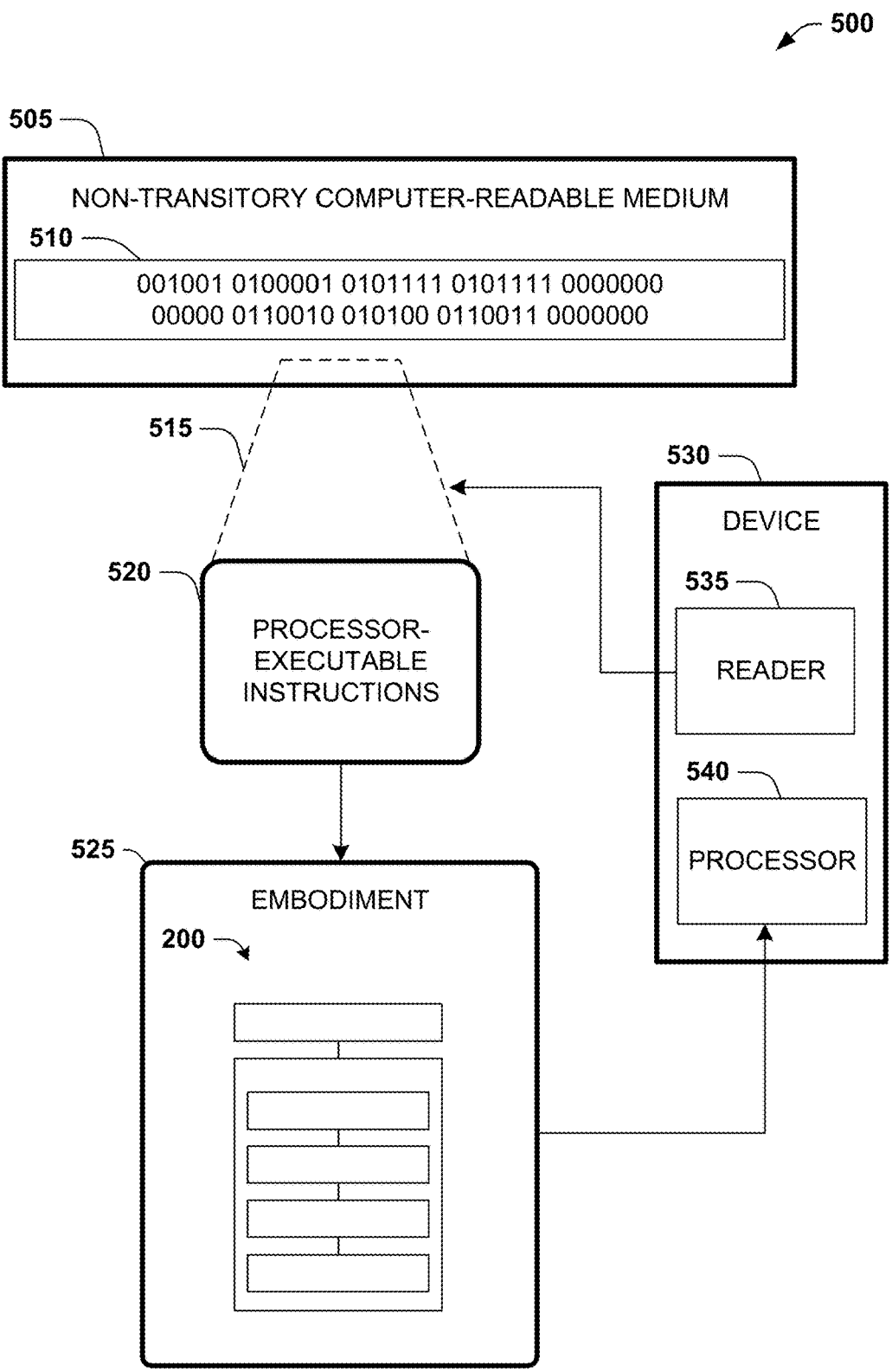
FIG. 5 illustrates an embodiment of a non-transitory computer-readable medium.

FIG. 5 is an illustration of a scenario 500 involving an example non-transitory computer-readable medium 505. In one embodiment, one or more of the components described herein are configured as program modules, such as the pre-provisioning module 105, stored in the non-transitory computer-readable medium 505. The program modules are configured with stored instructions, such as processor-executable instructions 520, that when executed by at least a processor, such as processor 540, cause the computing device to perform the corresponding function(s) as described herein. In one embodiment, the, functionality of the pre-provisioning module 105, stored in the non-transitory computer-readable medium 505, may be executed by the processor 540 as the processor-executable instructions 520 to perform an embodiment 525 of the method 200 of FIG. 2. In another embodiment, pre-provisioning functions of the pre-provisioning module 105 can be packaged and run as a cloud service of a cloud computing environment.

The non-transitory computer-readable medium 505 includes the processor-executable instructions 520 that when executed by a processor 540 cause performance of at least some of the provisions herein. The non-transitory computer-readable medium 505 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, a solid-state drive, or a magnetic or optical disc (such as a compact disk (CD), a digital versatile disk (DVD), or floppy disk). The example non-transitory computer-readable medium 505 stores computer-readable data 510 that, when subjected to reading 515 by a reader 535 of a device 530 (e.g., a read head of a hard disk drive, or a read operation invoked on a solid-state storage device), express the processor-executable instructions 520.

In some embodiments, the processor-executable instructions 520, when executed cause performance of operations, such as at least some of the example method 200 of FIG. 2, for example. In some embodiments, the processor-executable instructions 520 are configured to cause implementation of a system, such as at least some of the example system 100 of FIG. 1, for example.

Figure 6:
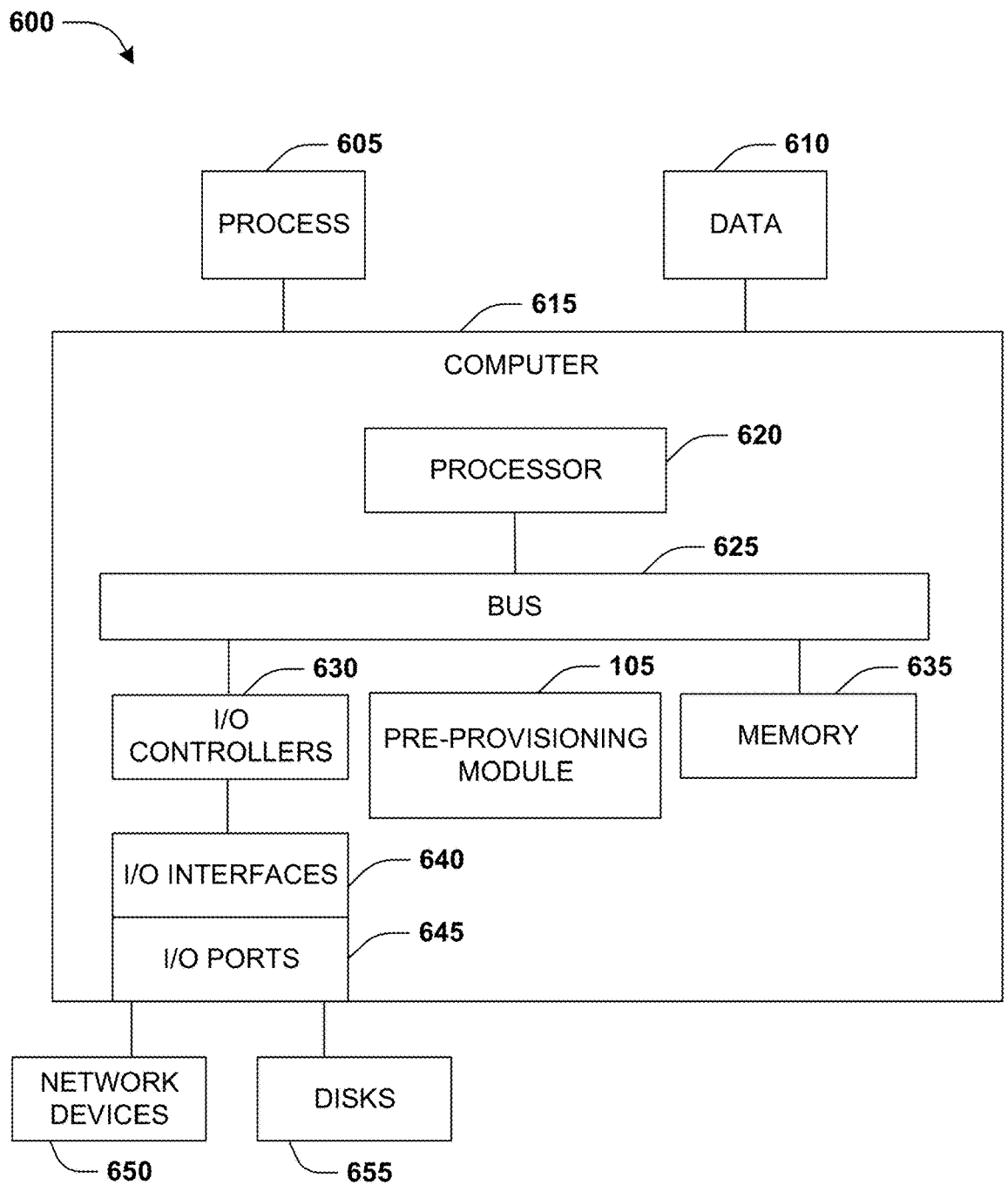
FIG. 6 illustrates an embodiment of a computing system configured with the example systems and/or methods disclosed.

FIG. 6 illustrates an specialized computing device 600 that is configured and/or programmed with one or more of the example systems and methods described herein, and/or equivalents. The computing device 600 may be the computer 615 that includes a processor 620, a memory 635, and I/O ports 645 operably connected by a bus 625. In one embodiment, the computer 615 includes logic of the pre-provisioning module 105 configured to facilitate the system 100 and/or the method 200 shown in FIGS. 1-2. In different embodiments, the logic of the pre-provisioning module 105 may be implemented in hardware, a non-transitory computer-readable medium 605 with stored instructions, firmware, and/or combinations thereof. While the logic of the pre-provisioning module 105 is illustrated as a hardware component, it is to be appreciated that in other embodiments, the logic of the pre-provisioning module 105 could be implemented in the processor 620, stored in memory 635, or stored in disk 655.

In one embodiment, logic of the pre-provisioning module 105 or the computer 615 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 615 as data 610 that are temporarily stored in memory 635 and then executed by processor 620.

The logic of the pre-provisioning module 105 may also provide means (e.g., hardware, non-transitory computer-readable medium 605 that stores executable instructions, firmware) for performing rule based source sequencing for allocation.

Generally describing an example configuration of the computer 615, the processor 620 may be a variety of various processors including dual microprocessor and other multi-processor architectures. The memory 635 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 655 may be operably connected to the computer 615 via, for example, the I/O interface 640 (e.g., card, device) and the I/O ports 645. The disks 655 may be, for example, a magnetic disk drive, a solid state disk drive, a floppy disk drive, a tape drive, a Zip drive, a flash memory card, a memory stick, and so on. Furthermore, the disks 655 may be a CD-ROM drive, a CD-R drive, a CD-RW drive, a DVD ROM, and so on. The memory 635 can store a process, such as within the non-transitory computer-readable medium 605, and/or data 610, for example. The disk 655 and/or the memory 635 can store an operating system that controls and allocates resources of the computer 615.

The computer 615 may interact with input/output (I/O) devices via the I/O interfaces 640 and the I/O ports 645. The I/O devices may be, for example, a keyboard, a microphone, a pointing and selection device, cameras, video cards, displays, the disks 655, the network devices 650, and so on. The I/O ports 645 may include, for example, serial ports, parallel ports, and USB ports. I/O controllers 630 may connect the I/O interfaces 640 to the bus 625.

The computer 615 can operate in a network environment and thus may be connected to the network devices 650 via the I/O interfaces 640, and/or the I/O ports 645. Through the network devices 650, the computer 615 may interact with a network. Through the network, the computer 615 may be logically connected to remote devices (e.g., the computer 615 may reside within a distributed computing environment to which clients may connect). Networks with which the computer 615 may interact include, but are not limited to, a local area network (LAN), a new area network (WAN), and other networks.

Figure 7:
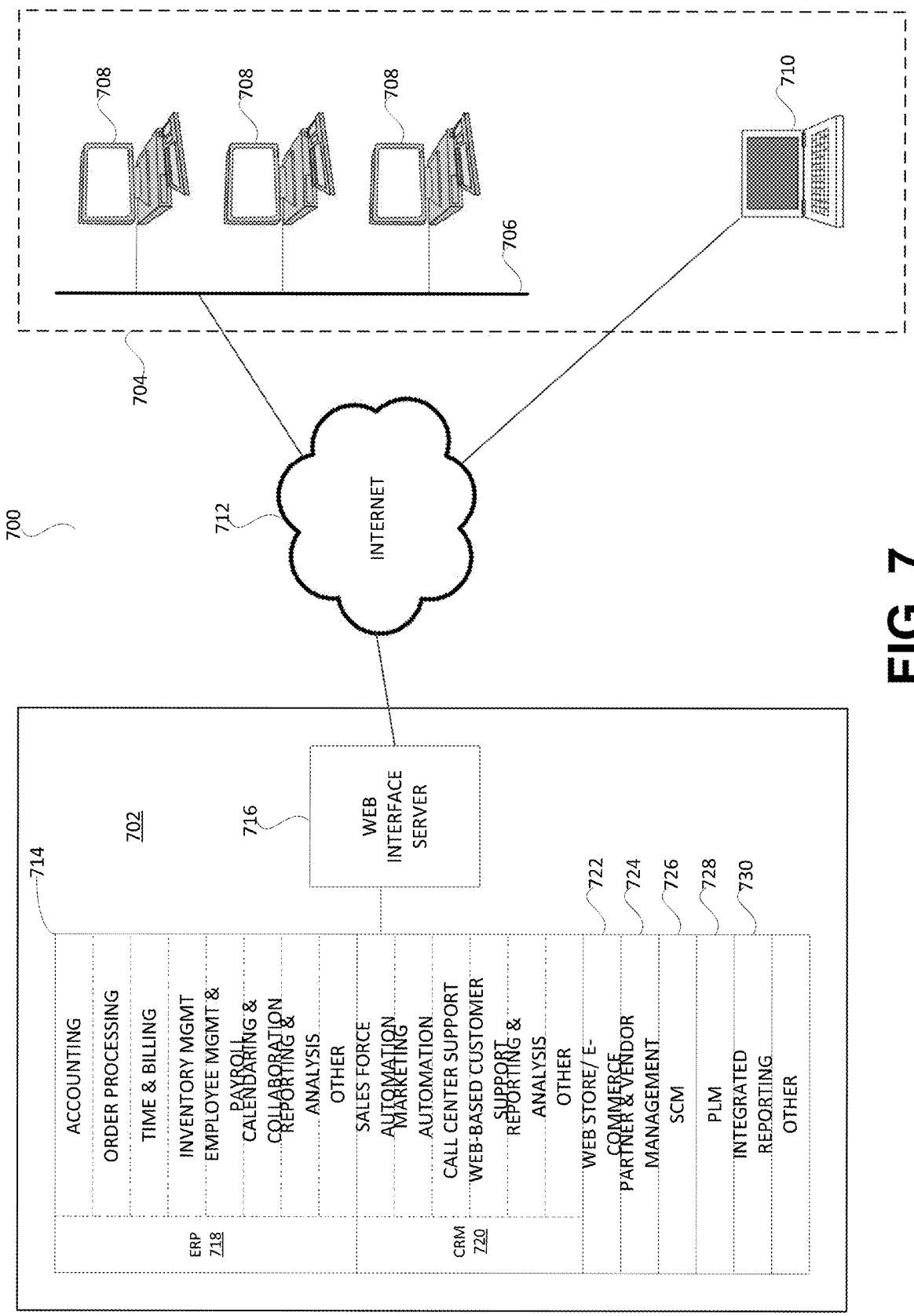
FIG. 7 illustrates an embodiment of an integrated business system and an enterprise network in which an embodiment of the invention may be implemented.

FIG. 7 is a diagram illustrating a system 700 in which an embodiment of the present system may be implemented including the pre-provisioning module 105 configured to facilitate the system 100 and/or the method 200 shown in FIGS. 1-2. Enterprise network 704 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection.

For simplicity and clarity of explanation, the enterprise network 704 is represented by an on-site local area network 706 to which a plurality of personal computers 708 are connected, each generally dedicated to a particular end user, such as a service agent or other employee (although such dedication is not required), along with an exemplary remote user computer 710 that can be, for example, a laptop computer or tablet computer of a traveling employee having internet access through a public Wi-Fi access point, or other internet access method. The end users (consumers) associated with computers 708 and 710 may possess an internet-enabled smartphone or other electronic device (such as a PDA, tablet, laptop computer) having wireless internet access or other synchronization capabilities. Users of the enterprise network 704 interface with the integrated business system 702 across the Internet 712 or another suitable communications network or combination of networks.

Integrated business system 702, which may be hosted by a dedicated third party, may include an integrated business server 714 and a web interface server 716, coupled as shown in FIG. 7. It is to be appreciated that either or both of the integrated business server 714 and the web interface server 716 may be implemented on one or more different hardware systems and components, even though represented as singular units in FIG. 7.

In an example in which system 702 is operated by a third party for the benefit of multiple account owners/tenants, each of whom is operating a business, integrated business server 714 comprises an ERP module 718 and further comprises a CRM module 720. In many cases, it will be desirable for the ERP module 718 to share methods, libraries, databases, subroutines, variables, etc., with CRM module 720, and indeed ERP module 718 may be intertwined with CRM module 720 into an integrated Business Data Processing Platform (which may be single tenant, but is typically multi-tenant).

The ERP module 718 may include, but is not limited to, a finance and accounting module, an order processing module, a time and billing module, an inventory management and distribution module, an employee management and payroll module, a calendaring and collaboration module, a reporting and communication module, and other ERP-related modules. The CRM module 720 may include, but is not limited to, a sales force automation (SFA) module, a marketing automation module, a contact list module (not shown), a call center support module, a web-based customer support module, a reporting and communication module, and other CRM-related modules.

The integrated business server 714 (or multi-tenant data processing platform) further may provide other business functionalities including a web store/eCommerce module 722, a partner and vendor management module 724, and an integrated reporting module 730. An SCM (supply chain management) module 726 and PLM (product lifecycle management) module 728 may also be provided. Web interface server 716 is configured and adapted to interface with the integrated business server 714 to provide one or more web-based user interfaces to end users of the enterprise network 704.

The integrated business system shown in FIG. 7 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote devices, and the software applications running on the remote devices, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 8:
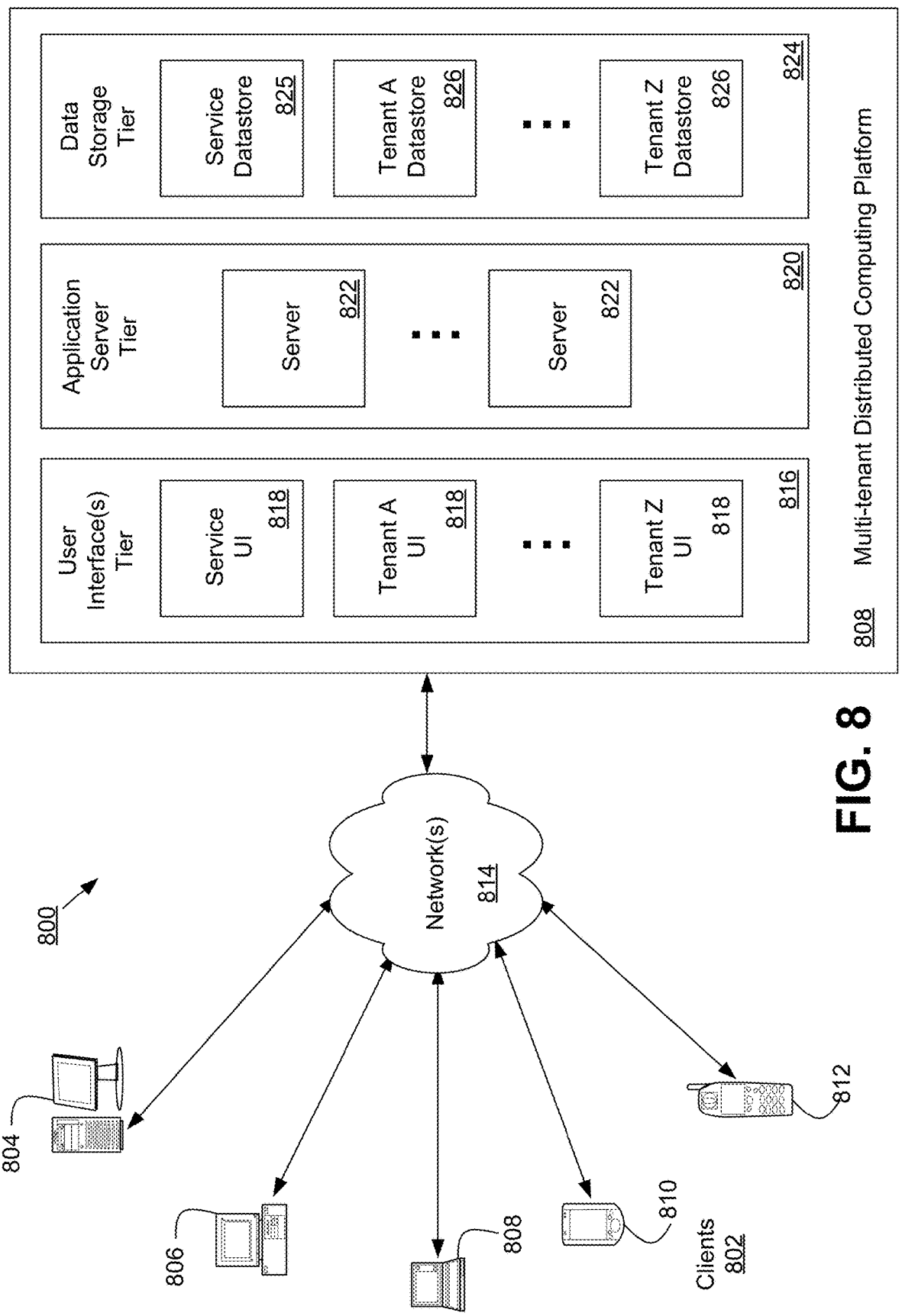
FIG. 8 illustrates an embodiment of a multi-tenant distributed computing service platform.

FIG. 8 is a diagram illustrating elements or components of an example operating environment 800 in which an embodiment of the present system may be implemented including the pre-provisioning module 105 configured to facilitate the system 100 and/or the method 200 shown in FIGS. 1-2. As shown, a variety of clients 802 incorporating and/or incorporated into a variety of computing devices may communicate with a distributed computing service/platform 808 through one or more networks 814. For example, a client may incorporate and/or be incorporated into a client application (e.g., software) implemented at least in part by one or more of the computing devices.

Examples of suitable computing devices include specially programmed or configured personal computers, server computers 804, desktop computers 806, laptop computers 808, notebook computers, tablet computers or personal digital assistants (PDAs) 810, smart phones 812, cell phones, and consumer electronic devices incorporating one or more computing device components, such as one or more electronic processors, microprocessors, central processing units (CPU), or controllers that are specially programmed with instructions for implemented one or more embodiments as disclosed herein. Examples of suitable networks 814 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 808 may include multiple processing tiers, including a user interface tier 816, an application server tier 820, and a data storage tier 824. The user interface tier 816 may maintain multiple user interfaces 818, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 824 may include one or more data stores, which may include a Service Data store 825 and one or more Tenant Data stores 826.

Each tenant data store 826 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 808 may be multi-tenant and service platform 808 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information. These distributed computing services may be executed as instances of a cloud computing environment.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 822 that are part of the platform's Application Server Tier 820.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions.

In addition to ERP and CRM functions, a business information system/platform (such as element 808 of FIG. 8(A)) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 822 that are part of the platform's Application Server Tier 820.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 808 of FIG. 8).

As noted with regards to FIG. 7, the integrated business system shown in FIG. 8 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computing device causes the processor to:

define a zone as a logical or physical entity within a cloud service hosting environment for hosting instances of a service utilizing virtual machines;

assign an available resource pool to the zone, wherein the available resource pool comprises processor resources, memory resources, storage resources, and networking resources that can be used by the virtual machines for executing the instances of the service;

assign pools to the zone for each service hosted by the zone, wherein the pools are designated for storing pre-provisioned instances of each service;

predict a number of pre-provisioned instances to be constructed based upon a predictive analysis of future demand for the service;

construct a plurality of pre-provisioned instances of the service within the pool for the service in accordance with the number predicted, wherein the plurality of pre-provisioned instances are constructed for the same service, and wherein each pre-provisioned instance comprises a computing environment of computing resources configured for subsequent installation and subsequent execution of executable code of at least one application associated with the service upon provisioning of the pre-provisioned instance;

wherein the service is a software service, and each constructed pre-provisioned instance does not include installed therein the executable code of the at least one application associated with the service;

assign at least one pointer to each of the plurality of pre-provisioned instances;

assign each of the plurality of pre-provisioned instances to the pool by adding the at least one pointer to a first collection of pointers associated with the pool;

in response to receiving a plurality of requests for execution of the same service from a plurality of users:
  select, for each request, a pre-provisioned instance from the plurality of pre-provisioned instances available from the pool based upon the pre-provisioned instance having computing resources matching computing resources requested for executing the service;
  identify an up-to-date version of the executable code from a code base of the service;
  provision the selected pre-provisioned instance by retrieving and installing the up-to-date executable code of the at least one application associated with the service into the computing environment of the pre-provisioned instance;
  remove the pre-provisioned instance from the pool by removing the at least one pointer of the pre-provisioned instance from the first collection of pointers; and
  execute the provisioned instance of the service and provide remote access to the service over a network to a user associated with the request.

2. The non-transitory computer-readable medium of claim 1, wherein the instructions comprise instructions to:
  execute the provisioned instance within an available resource pool comprising processor resources, memory resources, storage resources, and internet protocol address resources for executing the executable code of the at least one application.

3. The non-transitory computer-readable medium of claim 1, wherein the instructions comprise instructions to:
  execute the provisioned instances of the service by executing the provisioned instances through the virtual machines utilizing available resources from the available resource pool of the zone.

4. The non-transitory computer-readable medium of claim 1, wherein the instructions comprise instructions to:
  monitor fluctuations in resource utilization of the zone based upon the provisioned instances of the service consuming the available resources of the available resource pool; and
  add a new pool to the zone in response to the fluctuations indicating that available resources are available for pre-provisioning.

5. The non-transitory computer-readable medium of claim 1, wherein the instructions comprise instructions to:
  monitor fluctuations in resource utilization of the zone based upon the provisioned instances of the service consuming the available resources of the available resource pool; and
  remove a pool from the zone in response to the fluctuations indicating that additional resources are needed from the available resource pool for executing provisioned instances of the service.

6. The non-transitory computer-readable medium of claim 1, wherein the instructions comprise instructions to:
  receive a request to create a first pool, in a zone, for a first service; and
  utilize resources within an available resource pool of the zone to construct the first pool from which pre-provisioned instances of the first service can be constructed.

7. The non-transitory computer-readable medium of claim 1, wherein the instructions comprise instructions to:
  receive a request to delete a first pool for a first service in a zone of a cloud service hosting environment; and
  deallocate resources from first pool to an available resource pool of the zone to delete the first pool.

8. A computing system, comprising:
  a processor connected to memory; and
  a pre-provisioning module stored on a non-transitory computer readable medium and configured with instructions that when executed by the processor cause the processor to:
    define a zone as a logical or physical entity within a cloud service hosting environment for hosting instances of a service utilizing virtual machines;
    assign an available resource pool to the zone, wherein the available resource pool comprises processor resources, memory resources, storage resources, and networking resources that can be used by the virtual machines for executing the instances of the service;
    assign pools to the zone for each service hosted by the zone, wherein the pools are designated for storing pre-provisioned instances of each service;
    predict a number of pre-provisioned instances to be constructed based upon a predictive analysis of future demand for the service;
    construct a plurality of pre-provisioned instances of the service within the pool for the service in accordance with the number predicted, wherein the plurality of pre-provisioned instances are constructed for the same service, and wherein each pre-provisioned instance comprises a computing environment of computing resources configured for subsequent installation and subsequent execution of executable code of at least one application associated with the service upon provisioning of the pre-provisioned instance;
    wherein the service is a software service, and each constructed pre-provisioned instance does not include installed therein the executable code of the at least one application associated with the service;

assign at least one pointer to each of the plurality of pre-provisioned instances;

assign each of the plurality of pre-provisioned instances to the pool by adding the at least one pointer to a first collection of pointers associated with the pool;

in response to receiving a plurality of requests for execution of the same service from a plurality of users:

select, for each request, a pre-provisioned instance from the plurality of pre-provisioned instances available from the pool based upon the pre-provisioned instance having computing resources matching computing resources requested for executing the service;

identify an up-to-date version of the executable code from a code base of the service;

provision the selected pre-provisioned instance by retrieving and installing the up-to-date executable code of the at least one application associated with the service into the computing environment of the pre-provisioned instance;

remove the pre-provisioned instance from the pool by removing the at least one pointer of the pre-provisioned instance from the first collection of pointers; and execute the provisioned instance of the service and provide remote access to the service over a network to a user associated with the request.

9. The computing system of claim 8, wherein the instructions to provision the selected pre-provisioned instance comprise instructions that cause the processor to:

in response to determining that there is an available update to the executable code, apply the available update to the executable code to modify the executable code; and install the modified executable code within the pre-provisioned instance during provisioning.

10. The computing system of claim 8, wherein the instructions comprise instructions that cause the processor to:

execute provisioned instances of the services through the virtual machines utilizing available resources from the available resource pool of the zone.

11. The computing system of claim 10, wherein the instructions comprise instructions that cause the processor to:

monitor fluctuations in resource utilization of the zone based upon the provisioned instances of the service consuming the available resources of the available resource pool; and add a new pool to the zone in response to the fluctuations indicating that available resources are available for pre-provisioning.

12. The computing system of claim 8, wherein the instructions comprise instructions that cause the processor to:

construct the pre-provisioned instance as a partial instance that includes a portion of the computing resources for the service.

13. A computer-implemented method, the computer-implemented method involving a computing device comprising a processor, and the computer-implemented method comprising:

defining a zone as a logical or physical entity within a cloud service hosting environment for hosting instances of a service utilizing virtual machines;

assigning an available resource pool to the zone, wherein the available resource pool comprises processor resources, memory resources, storage resources, and networking resources that can be used by the virtual machines for executing the instances of the service;

assigning pools to the zone for each service hosted by the zone, wherein the pools are designated for storing pre-provisioned instances of each service;

predicting a number of pre-provisioned instances to be constructed based upon a predictive analysis of future demand for the service;

constructing, by the processor, a plurality of pre-provisioned instances of the service within the pool for the service in accordance with the number predicted, wherein the plurality of pre-provisioned instances are constructed for the same service, and wherein each pre-provisioned instance comprises a computing environment of computing resources configured for subsequent installation and subsequent execution of executable code of at least one application associated with the service upon provisioning of the pre-provisioned instance;

wherein the service is a software service, and each constructed pre-provisioned instance does not include installed therein the executable code of the at least one application associated with the service;

in response to receiving a plurality of requests for execution of the same service from a plurality of users:

selecting for each request, by the processor, a pre-provisioned instance from the plurality of pre-provisioned instances available from the pool based upon the pre-provisioned instance having computing resources matching computing resources requested for executing the service;

identifying an up-to-date version of the executable code from a code base of the service;

provisioning the pre-provisioned instance by retrieving and installing the up-to-date executable code of the service into the computing environment of the pre-provisioned instance;

removing the pre-provisioned instance from the pool by removing at least one pointer of the pre-provisioned instance from a collection of pointers associated with the pool; and executing, by the processor, the provisioned instance of the service and provide remote access to the service over a network to a user associated with the request.

14. The computer-implemented method of claim 13, further comprising:

maintaining a plurality of zones as physical or logical entities within a cloud service hosting environment for hosting instances of services utilizing virtual machines.

15. The computer-implemented method of claim 14, further comprising:

hosting instances of the service within multiple zones of the plurality of zones.

16. The computer-implemented method of claim 15, further comprising:

constructing pools for the service within the multiple zones of the plurality of zones, wherein the pools are designated for storing pre-provisioned instances of each service;

wherein for a first pool of the pools:

assigning at least one pointer to the pre-provisioned instance;

assigning the pre-provisioned instance to the first pool by adding the at least one pointer to a first collection of pointers associated with the first pool.

17. The computer-implemented method of claim 13, further comprising: executing the provisioned instance within an available resource pool comprising processor resources, memory resources, storage resources, and internet protocol address resources for executing the executable code.

* * * * *